United States Patent [19]

Ehrlich et al.

[11] 4,169,196

[45] Sep. 25, 1979

[54] PROCESS FOR IMPROVING THERMOPLASTIC POLYURETHANES

[75] Inventors: Benjamin S. Ehrlich; Curtis P. Smith, both of Cheshire, Conn.

[73] Assignee: The Upjohn Company, Kalamazoo, Mich.

[21] Appl. No.: 842,063

[22] Filed: Oct. 14, 1977

[51] Int. Cl.$^2$ ................ C08G 18/24; C07C 41/12; C08K 5/52
[52] U.S. Cl. ................ 528/58; 252/400 A; 260/2.3; 260/45.7 PH; 528/76; 528/81; 528/83; 528/51; 568/620; 568/581
[58] Field of Search ............... 260/77.55 S, 77.5 AR, 260/75 NR, 77.5 AN, 75 NB, 611.5, 2.3; 252/400 A; 528/76, 83, 51, 81

[56] References Cited

U.S. PATENT DOCUMENTS

| | | | |
|---|---|---|---|
| 3,205,269 | 9/1965 | Friedman | 260/611.5 |
| 3,240,730 | 3/1966 | Hostettler et al. | 260/75 NB |
| 3,392,128 | 7/1968 | Hostettler et al. | 260/75 NB |
| 3,392,153 | 7/1968 | Hostettler et al. | 260/75 NB |
| 3,398,106 | 8/1968 | Hostettler et al. | 260/75 NB |
| 3,642,964 | 2/1972 | Rausch et al. | 264/176 R |

FOREIGN PATENT DOCUMENTS 7511697  4/1977  Netherlands ................... 252/400 A

OTHER PUBLICATIONS

M&T Chemicals Data Sheet #246—"Catalyst T-10", Rahway (N.J.) 1967.

Primary Examiner—H. S. Cockeram
Attorney, Agent, or Firm—James S. Rose; Denis A. Firth

[57] ABSTRACT

An improved process for the preparation of thermoplastic polyurethane elastomers by a one-shot reaction of an organic diisocyanate, a polymeric diol, and a diol extender is disclosed wherein the diol components, either singly or together, are treated with a trivalent phosphorus compound prior to their reaction with the diisocyanate in the presence of a stannous tin urethane catalyst. The process when carried out with pure urethane grade diol components results in very efficient catalysis which in turn requires lower levels of stannous tin catalyst than would otherwise be employed. Moreover, the process can be carried out with diol components that are not urethane grade materials but which are contaminated by high levels of peroxidic impurities and which materials would otherwise be useless for the preparation of high grade elastomer products.

7 Claims, No Drawings

PROCESS FOR IMPROVING THERMOPLASTIC POLYURETHANES

BACKGROUND OF THE INVENTION

1. Field of the Invention

This invention relates to a process for the preparation of polyurethane elastomers and is more particularly concerned with improved catalysis for the preparation of polyurethane elastomers.

2. Description of the Prior Art

Thermoplastic non-cellular polyurethane elastomers are currently available for use in the preparation of articles by injection molding, extrusion and like techniques. These elastomers are generally prepared by the reaction of an organic diisocyanate, a polymeric diol, and a difunctional extender in the presence of a catalyst. Monomer purity is particularly critical both in terms of the effect it can have on the progress of the reaction by way of its effect on the catalyst and the effect it may have on the resultant polymer properties.

Polymeric diols including the types of polyester and polyether diols used in the preparation of polyurethanes are subject to peroxidic impurity formation. Such peroxidic impurities are not limited to polymeric diols but form also in low molecular weight diols of the type used for extending the polyurethane reaction. Peroxide content of diols used in polyurethane elastomer formation must be kept below certain critical levels otherwise unacceptable polymer properties or reactions result, if, indeed, the polyurethane can be prepared at all. Ideally, elastomer grade polymeric diols and diol extenders should not have peroxide contents above 10 p.p.m. (see Siggia. S., Quantitative Organic Analysis via Functional Groups, John Wiley and Sons, Inc., New York, N.Y., 1963, p. 255 for analytical method for determining peroxide content) and the prior art discloses the addition of various antioxidants to the diols and extenders to inhibit the formation of peroxides. However, diols and extenders not containing stabilizers or antioxidants, after storage or heating or the like, can easily have peroxide contents ranging up to 200–300 p.p.m. rendering them literally useless for the preparation of polyurethane elastomers. Heretofore, no method has been disclosed in which such contaminated materials can be used efficiently in the preparation of high grade elastomer products.

Thus, both the ingredients and the elastomers produced therefrom have been stabilized using various types of antioxidant and scavenging type additives. For example U.S. Pat. No. 2,915,496 discloses a method for preparing a heat and weather resistant polyurethane elastomer by the addition of an antioxidant material to the urethane forming ingredients. U.S. Pat. No. 3,205,269 discloses the stabilization of polyethers and polyether alcohols by the addition of certain phosphites, thiophosphites, cyclic phosphites and the like. The stabilized materials are used, typically, in the manufacture of polyurethanes. Stabilization of the diisocyanate component is also well known; see for example U.S. Pat. No. 2,950,307 and U.S. Pat. No. 3,715,381. Further, certain phosphite and phosphine compounds have been observed to catalyze the formation of integral-skinned polyurethane foams; see U.S. Pat. No. 4,021,381.

Phosphorus containing antioxidants, particularly the phosphites (see U.S. Pat. No. 3,205,269 cited supra), while being recognized as effective antioxidants, are generally avoided because of their tendency to hydrolyze in the presence of trace amounts of moisture. The phosphorus acids thereby produced over an extended period of time are extremely detrimental to the polyurethane forming reaction.

It is an object of the present invention to provide a method for the preparation of polyurethane elastomers which method can employ polymeric diols or diol extenders which contain higher than normally acceptable levels of peroxide impurity and which heretofore would not be considered useful for the preparation of high-grade polyurethane elastomers.

It is a further object to effect the polyurethane reaction in the presence of lower levels of the expensive polyurethane forming catalysts.

These objectives and others are readily accomplished by carrying out the polyurethane reaction in the presence of a particular stannous tin catalyst and using a polymeric diol and diol extender one or both of which have been treated with a particular phosphorus compound prior to the one-shot polyurethane formation.

SUMMARY OF THE INVENTION

The invention comprises a process for the preparation of a thermoplastic polyurethane elastomer which is prepared by a one-shot reaction of an organic diisocyanate, a polymeric diol and a diol extender in the presence of a urethane catalyst, the improvement which comprises treating at least one of the said diol components with a minor amount of a trivalent phosphorus compound prior to reacting said diol components with said diisocyanate in the presence of a stannous tin urethane catalyst.

The term "trivalent phosphorus compound" means a compound having the formula $PX_3$ wherein each X is a radical independently selected from the group consisting of aryl, aryloxy, and lower alkoxy.

The term "aryl" means a radical obtained by removing a nuclear hydrogen atom from an aromatic hydrocarbon and is inclusive of phenyl, lower alkyl substituted phenyl, naphthyl, lower alkyl substituted naphthyl, diphenyl, and the like.

The term "aryloxy" means a radical obtained by removing the phenolic hydrogen atom from a hydroxyaryl compound wherein aryl is defined as above and is inclusive of phenoxy, lower alkyl substituted phenoxy, naphthoxy, lower alkyl substituted naphthoxy, diphenylyloxy, and the like.

The term "lower alkoxy" means an alkoxy having from 1 to 8 carbon atoms, inclusive, such as methoxy, ethoxy, propoxy butoxy, pentoxy, hexoxy, heptoxy, octoxy, and isomeric forms thereof.

DETAILED DESCRIPTION OF THE INVENTION

The process for the preparation of the polyurethane elastomers in accordance with the present invention involves the conventional one-shot synthesis technique (i.e. the process in which all the active hydrogen containing reactants, particularly a polymeric diol component and diol extender and the diisocyanate are brought together without any prereaction between two or more of these components).

The novelty in the present invention resides in the treatment of either the polymeric diol or diol extender or combination of both together with a trivalent phosphorus compound defined above prior to the one-shot formation of the polyurethane in the presence of a stannous tin polyurethane catalyst. In a preferred embodiment, the novel steps in accordance with the present invention are employed in the continuous one-shot procedure disclosed in U.S. Pat. No. 3,642,964.

A preferred group of trivalent phosphorus compounds is comprised of those $PX_3$ compounds wherein each X is independently selected from aryloxy and lower alkoxy. A most preferred group comprises those compounds wherein X is aryloxy.

Illustrative of the trivalent phosphorus compounds are triphenyl phosphine, tri(biphenyl)phosphine, trinaphthyl phosphine, tri(p-tolyl)phosphine, tri(p-butylphenyl)phosphine, tri(p-octylphenyl)phosphine; triphenyl phosphite, tri(biphenyl)phosphite, trinaphthyl phosphite, tri(p-tolyl)phosphite, tri(p-butylphenyl)phosphite, tri(p-octylphenyl)phosphite, trimethyl phosphite, triethyl phosphite, tributyl phosphite, trihexyl phosphite, trioctyl phosphite, diethyl phenylphosphonite, dibutyl phenylphosphonite, butyl diphenylphosphinite, and the like.

A preferred group of trivalent phosphorus compounds comprises triphenyl phosphite, tri(p-tolyl)phosphite, tri(p-butylphenyl)phosphite, tri(p-octylphenyl)phosphite, tributyl phosphite, trihexyl phosphite, and trioctyl phosphite.

A most preferred trivalent phosphorus compound is triphenyl phosphite.

Generally speaking, the quantity of trivalent phosphorus compound used in the process in accordance with this invention is a minor amount.

The amount of the trivalent phosphorus compound employed in the process of the invention, expressed as the weight of the trivalent phosphorus atom alone, is advantageously within a range of from about 0.001 to about 0.05 percent by weight of the total weight of the polyurethane forming ingredients and preferably is within the range of from about 0.005 to about 0.01 percent by weight.

The trivalent phosphorus compound is believed to play an ancillary role to the stannous tin urethane catalysis by increasing the catalytic effectiveness of the stannous catalyst. While not wishing the present invention to be bound by any theoretical considerations but only by the claims appended hereinbelow, it is believed that the ancillary catalytic role played by the trivalent phosphorus compounds in the present process involves the reduction of peroxidic impurities in the polymeric diol or diol extender with the concomitant oxidation of the trivalent phosphorus compound. Removal of a large amount of peroxidic impurity from the diols which are grossly impure allows the stannous catalyst to catalyze more effectively the hydroxyl-isocyanate reaction.

Alternatively, removal of the minor amounts of peroxidic impurity from diols already considered pure enough for polyurethane formation (less than 10 p.p.m.) allows for more efficient catalysis using smaller amounts of stannous catalysts than has heretofore been possible to achieve.

Presumably, in the absence of the trivalent phosphorus compound the peroxidic impurities oxidize the stannous tin catalyst up to the stannic state thereby rendering the catalyst less efficient.

Treating the polymeric diol or diol extender with the trivalent phosphorus compound is carried out simply by mixing the components together for a period of about 0.5 hour to about 24 hours, preferably for about 1 hour to about 8 hours, by whatever means is convenient, prior to their reaction with the diisocyanate. Mixing of the trivalent phosphorus compound with the diols at the time of the final polymerization reaction between the diol components and the diisocyanate is not in accordance with the present invention and does not provide the beneficial results of the presently improved procedure (note Example 3, sample J-VI). On the other hand the time interval which may elapse between treatment of the diol components with the phosphorus compound and the final polymerization stage is not critical. Conveniently, the polymerization can immediately follow the treatment step. Alternatively, the treated diols can be held for periods of at least 24 hours before the polymerization.

The mixing of the components may be accomplished by any form of agitation, mechanical stirring and the like including agitation as a result of sparging by an inert gas, and even agitation caused by subjecting the mixture to vacuum with the concomitant bubbling of the mixture. The mixing can be carried out at room temperature but preferably is done at a temperature of from about 80° C. to about 150° C. and most preferably 95° C. to 120° C.

The choice of which diol, polymeric diol or diol extender, is to be treated with the trivalent phosphorus compound depends primarily on which one is contaminated by the unacceptable level of peroxide content and that one must be treated.

In one embodiment of the present invention, the polymeric diol or diol extender or combination of both, neither one of which are contaminated by unacceptable levels of peroxide, is treated with the phosphorus compound because the treatment gives rise to the use of lower levels of the expensive stannous tin catalyst as noted hereinbefore.

In a preferred embodiment of the present process which is readily adaptable to the continuous one-shot polyurethane elastomer preparation described in U.S. Pat. No. 3,642,964, a mixture of the polymeric diol, diol extender, and the catalytic amount of the trivalent phosphorus compound is heated and degassed just prior to reaction with the diisocyanate. In a most preferred embodiment the mixture of the catalytic amount of the phosphorus compound and the polymeric diol is exposed to the standard heating and degassing stage under vacuum. This is immediately followed by the addition of the diol extender and the heating and degassing under vacuum is continued. Using this procedure one is assured of achieving maximum purity of the active hydrogen containing reactants without suffering loss of any of the components through evaporation.

The stannous tin catalyst used in accordance with the process of the present invention includes any of the tin compounds in the plus two valence state which are known to catalyze the formation of polyurethanes.

Illustrative of such tin catalysts are stannous acetate, stannous propionate, stannous butyrate, stannous octoate, stannous laurate, stannous palmitate, stannous oleate, stannous linoleate, stannous stearate, stannous naphthenate, stannous oxalate, stannous tartrate, stannous ethylene glycoxide, and the like.

A preferred tin catalyst is stannous octoate.

The amount of tin catalyst employed is generally within the range of about 0.02 to about 2.0 percent by weight based on the total weight of reactants.

However, as discussed hereinabove, as an additional and unexpected benefit to be derived from the present invention the amount of tin catalyst can be reduced down to lower quantities than heretofore employed, namely, down to levels of about 0.005 to about 0.50 percent by weight based on total reactant weight.

In an added and unexpected advantage which flows from the use of lowered amounts of stannous catalyst, the resulting polyurethanes exhibit less polymer degradation when reprocessing the materials by molding, extruding, injection molding, and other high temperature procedures to which the polymers may be subjected. This provides for better polymer color stability also. Stannous catalysts in combination with diol resin mixes are known to suffer from catalyst instability problems. Such problems are now obviated.

The polymeric diols and diol extenders which can be used are those conventionally employed in the art for the preparation of such elastomers. The polymeric diols advantageously have molecular weights in the range of 400 to 4000 and preferably within the range of about 500 to about 3000. Illustrative of polymeric diols are polyester diols and polyether diols and mixtures thereof having molecular weights within the above range. The polyester diols include the essentially linear polymeric diols which are obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxyl-terminated. Representative dicarboxylic acids (or their anhydrides) employed in the preparation of the polyester diols are adipic, succinic, pimelic, suberic, azelaic, sebacic, terephthalic, phthalic, and the like acids or their anhydrides or mixtures of two or more of said acids or anhydrides. Adipic acid is the preferred acid. Representative glycols employed in the preparation of the polyester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

In addition to the above type of polyester diols, there can also be used the polycaprolactone diols which are prepared by polymerizing the appropriate caprolactone with the appropriate difunctional initiator, such as an aliphatic glycol as exemplified above or an alkanolamine such as ethanolamine, propanolamine, butanolamine, and the like. Such procedures and products are well-known in the art; see, for example, U.S. Pat. No. 2,914,556. A particularly preferred polyester diol is that obtained by initiating the polymerization of $\epsilon$-caprolactone with 1,4-butanediol.

The polyether polyols employed in the preparation of the polyurethane elastomers of the invention include the polyether glycols having molecular weights in the above defined range and prepared by reacting ethylene oxide, propylene oxide, butylene oxide, or mixtures thereof with water or with diols such as ethylene glycol, 1,2-propylene glycol, 1,3-propanediol 1,4-butanediol, 2,3-butanediol, 1,5-pentanediol, 1,2-hexanediol, diethanolamine, resorcinol, catechol, bis(p-hydroxyphenyl)methane, diethylene glycol, dipropylene glycol, and the like.

The extenders which are employed in preparing the polyurethane elastomers of the invention can be any of the diol extenders commonly employed in the art. Illustrative of diol extenders are aliphatic diols, advantageously containing from 2 to 6 carbon atoms, inclusive, such as ethylene glycol, 1,3-propylene glycol, 1,2-propylene glycol, 1,4-butanediol, 1,2-hexanediol, neopentyl glycol, and the like; and dihydroxyalkylated aromatic compounds such as the bis(2-hydroxyethyl)ethers of hydroquinone and resorcinol; p-xylene-$\alpha,\alpha'$-diol; the bis(2-hydroxyethyl)ether of p-xylene-$\alpha,\alpha'$-diol; m-xylene-$\alpha,\alpha'$-diol and the bis(2-hydroxyethyl)ether thereof.

The organic diisocyanate employed in the process of the invention can be any of those commonly employed in the preparation of polyurethane elastomers. Illustrative of said diisocyanates are 2,4-tolylene diisocyanate, 2,6-tolylene diisocyanate, 4,4'-methylenebis(phenyl isocyanate), 3,3'-dimethyl-4,4'-diisocyanatodiphenyl, 3,3'-dimethoxy-4,4'-diisocyanatodiphenyl, 3,3'-dichloro-4,4'-diisocyanatodiphenyl, $\beta,\beta'$-diisocyanato-1,4-diethylbenzene, 1,5-naphthalene diisocyanate, 1,4-phenylene diisocyanate, and the like, including mixtures of two or more of the above diisocyanates. The preferred diisocyanate is 4,4'-methylenebis(phenyl isocyanate).

In carrying out the above-described one-shot reaction, the various reactants are employed in such proportions that the ratio of isocyanate groups to the total number of hydroxyl groups or other active hydrogen containing groups in the polymeric diol and diol extender is within the range of 0.95:1 to 1.10:1 and, preferably, within the range of 0.98:1 to 1.04:1. Further, as will be appreciated by one skilled in the art, the proportion of polymeric diol to extender can be varied over a wide range depending largely upon the desired hardness of the final polyurethane elastomer. Advantageously, the molar proportion of polymeric diol to extender is within the range of 0.05:1 to 2:1 and preferably within the range of 0.1:1 to 1:1.

As set forth above, the polyurethane elastomers of the invention are made by the one-shot procedure using either a batch or a continuous process. In such procedures the reactants are brought together in any order and in separate or preblended streams. Advantageously, the polyols, i.e. the polymeric diol, and the diol extender, are preblended and fed to the reaction mixture as a single component, after having been treated with the trivalent phosphorus compound as discussed hereinbefore. The mixing of the reactants including the treated hydroxyl components, catalysts, diisocyanate, etc., can be accomplished by any of the procedures and apparatus conventional in the art and the polyurethane forming reaction allowed to proceed followed by an extrusion or molding of the formed elastomer which is usually subjected to a curing step; see U.S. Pat. No. 3,642,964 for typical reaction conditions exemplifying a continuous process and whose disclosure is incorporated by reference herein.

If desired, the elastomers of the invention can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

The polyurethane elastomers produced in accordance with the present process can be molded, extruded, or injection molded, into blocks, films, tubing, ribbons, intricate profiles and cross-sections, and detailed parts which find utility in such applications as wheels, printing plates, gear wheels, treads for recreational vehicles such as snowmobiles and all-terrain vehicles, various types of hose for transporting fluids, and the like.

The following examples describe the manner and process of making and using the invention and set forth the best mode contemplated by the inventors of carrying out the invention but are not to be construed as limiting.

EXAMPLE 1

A series of six elastomer samples was prepared using the reactants and proportions (expressed in equivalents) set forth in Table I. Samples B, C, and F are in accordance with the present invention while A, D, and E are not. The results illustrate the fact that 1,4-butanediol technical grade and contaminated with a very high peroxide content can still be employed as a diol extender in accordance with the present invention and not retard polyurethane formation.

The following standard procedure was employed for the preparation of each of the polyurethane samples. Reactant quantities were chosen so that the final sample would be 500 g. The polymeric diol component (either the polycaprolactone diol or the polyalkyleneoxy diol) was degassed by heating under reduced pressure (about 0.1 mm of Hg) for about 2 hours at 90°–100° C. The 1,4-butanediol extender was added and the degassing continued under the same conditions and time period set forth above for the first degassing.

The degassed resin at about 85°–90° C. was weighed into an 800 ml. capacity polyethylene beaker followed immediately by the stannous octoate solution. Mixing of the components was accomplished by manually stirring them with a wooden tongue depressor for about 10 seconds.

The diisocyanate component was added quickly and the reactants rapidly hand stirred with the wooden tongue depressor until a sudden viscosity increase was observed. The reaction mixture was then immediately poured into a Teflon lined pan where it hardened to form a polyurethane pie. The time when the sudden viscosity increase was observed was recorded as the gel time and the reactants had to be poured quickly from the beaker before the viscosity build-up made transfer difficult. Also, in this mixing period the reaction mixture was observed for any telltale signs of color change the significance of which is discussed below.

The 1,4-butanediol employed in the series was a technical grade and had a peroxide content of approximately 0.03 percent by wt. determined by observing the blue coloration formed by the standard peroxychromic acid test for peroxide (see American Chemical Society Monograph #128, Hydrogen Peroxide, p. 549, 1955, Reinhold Publishing Corporation, New York, N.Y.) and comparing this coloration with those observed when the same test was carried out on pure peroxide-free 1,4-butanediol samples spiked with known levels of hydrogen peroxide.

In samples B, C, and D the polycaprolactone diol constituents were mixed with 0.5 percent w/w based on the total formulation weight of triphenyl phosphite before they were subjected to the degassing step. In Sample F 0.1 percent of triphenyl phosphite was mixed into the polymeric diol mixture before degassing. The diols of Samples A and E received no triphenyl phosphite treatment.

Samples B and C had gel times 9× and 4.5× faster than the untreated control Sample A. Sample D while receiving the triphenyl phosphite treatment contained no stannous octoate catalyst. It had an observed gel time twice as long as the control Sample A which demonstrated the lack of catalytic effect of triphenyl phosphite alone for the polyurethane reaction. Color changes in the reacting formulations were not recorded in the case of Samples A through D.

Sample F displayed a gel time 9× faster than Sample E. The reaction mixture of Sample E prior to the gel time displayed rapid transitory color changes from blue to green to yellow. Sample F showed no such color changes. The transitional color changes were attributed to some form of free radical transitions arising from the presence of the peroxidic impurity.

TABLE I

| Elastomer | A | B | C | D | E | F |
|---|---|---|---|---|---|---|
| 4,4'-methylenebis(phenyl isocyanate); equiv. | 6.06 | 6.06 | 6.06 | 6.06 | 7.83 | 7.83 |
| polycaprolactone diol[1] (m.w. = 2000); equiv. | 1.0 | 1.0 | 1.0 | 1.0 | — | — |
| polypropyleneoxypolyethyleneoxy diol[2] (m.w. = 2000); equiv. | — | — | — | — | 1.0 | 1.0 |
| 1,4-butanediol; equiv. | 5.0 | 5.0 | 5.0 | 5.0 | 6.25 | 6.25 |
| polyethyleneoxy diol (m.w. = 400); equiv. | — | — | — | — | 0.5 | 0.5 |
| stannous octoate solution[3] % w/w | 0.03 | 0.03 | 0.015 | — | 0.03 | 0.03 |
| NCO/OH | 1.01 | 1.01 | 1.01 | 1.01 | 1.01 | 1.01 |
| Gel time (seconds) | 45 | 5 | 10 | 1.5 mins. | 36 | 4 |
| Color change | — | — | — | — | Yes | No |

Footnotes to Table I
[1]Polycaprolactone diol, initiated with 1,4-butanediol, OH # = 56, acid # = 0.053.
[2]Polypropyleneoxypolyethyleneoxy diol is a 2000 m.w. block copolymer having a polypropyleneoxy central block of m.w. = 1100 which is capped with polyethyleneoxy groups up to 2000 m.w.; eq. wt. = 1000.
[3]Stannous octoate solution is a 50/50 percent w/w of stannous octoate dissolved in dioctyl phthalate as a carrier.

Five samples of impure 1,4-butanediol obtained from the same source as those employed in the above elastomer formulations were heated and degassed for 1.5 hours at 70° C. with the following compounds each present at 0.5 percent by weight. At the conclusion of the period each sample was tested by the peroxychromic acid test for the presence of peroxide.

| Compound | Peroxide Test |
|---|---|
| Triphenyl phosphite | Neg. |
| Triphenyl phosphine | Neg. |
| Triethyl phosphite | Neg. |
| Tributyl phosphine | Pos. |
| Trinonyl phosphite (was insol.) | Pos. |
| Thiodiethylene bis-β(3,5-di-t-butyl-4-hydroxyphenyl) propionate (Irganox 1035 Anti-oxidant supplied by Ciba Geigy Corp., Ardsley, New York) | Pos. |
| Control (nothing added) | Pos. |

EXAMPLE 2

A series of 3 elastomer samples was prepared using the reactants and proportions (expressed in equivalents) set forth in Table II. Sample G was not in accordance with the present invention while H and I were.

The same procedure and apparatus set forth in Example 1 was employed in the present preparations except where noted below. The 1,4-butanediol employed was selected from the same source as Example 1 and therefore was contaminated to the extent of about 0.03% by wt. of peroxide content.

Additional ingredients to those employed in Example 1 was a wax lubricant which was added to the polyethylene beaker prior to the addition of the stannous octoate and an antioxidant component (identified in the footnote 1 of Table II) added to the polyalkyleneoxy diol of all three samples prior to the degassing step. The concentration of triphenyl phosphite added to the polyalkyleneoxy diol was 0.05 percent w/w based on the total formulation weight for Sample H and I and none was added to the control Sample G.

As noted above the procedure was the same as in Example 1 except for the degassing period in Sample H after the addition of the butanediol which was 40 minutes. This degassing period in Sample I was 60 minutes (the same as in Example 1).

In control Sample G a gel time of 35 seconds along with the transitory color changes of the resin mix from blue to green to yellow was observed. Samples H and I in accordance with the invention had gel times 3.9× and 7× faster than the control and showed no color changes. The shorter degassing period in Sample H compared to Sample I resulted in a gel time for the latter of almost half that of the former. The phenolic antioxidant already present in the diol could not overcome the effect of the peroxidic impurity in the 1,4-butanediol which impeded the action of the stannous octoate catalyst in the untreated preparation G.

TABLE II

| Elastomer | G | H | I |
|---|---|---|---|
| 4,4'-methylenebis(phenyl isocyanate); equiv. | 7.83 | 7.83 | 7.83 |
| polypropyleneoxypolyethyleneoxy diol[1]; equiv. | 1.0 | 1.0 | 1.0 |
| 1,4-butanediol; equiv. | 6.25 | 6.25 | 6.25 |
| polyethyleneoxy diol (m.w. = 400); equiv. | 0.5 | 0.5 | 0.5 |
| stannous octoate solution % w/w | 0.03 | 0.03 | 0.03 |
| wax lubricant[2] % w/w | 0.25 | 0.25 | 0.25 |
| NCO/OH | 1.01 | 1.01 | 1.01 |
| Gel time (seconds) | 35 | 9 | 5 |
| Color change | Yes | No | No |

Footnotes to Table II
[1]Same diol described in footnote 2 of Table I except that it contains 0.5% by weight of thiodiethylene bis-β(3,5-di-t-butyl-4-hydroxyphenyl)propionate as an antioxidant.
[2]Wax lubricant is a bisamide wax, Advawax 280 (Cincinnati Milacron Chem. Corp., Cincinnati, Ohio).

EXAMPLE 3

A series of six elastomer samples (J-I through J-VI) was prepared using the same formulation and procedure set forth in Example 2 except where noted below. Only J-V is in accordance with the present invention. This example shows that a minimum amount of trivalent phosphorus compound is necessary to achieve the advantages in accordance with the invention and the minimum amount depends on the extent of the peroxide impurity in the diol.

The same impure 1,4-butanediol used in previous examples was employed in this series. The varying amounts of the triphenyl phosphite employed along with the times to which each 1,4-butanediol sample was exposed to the degassing period in contact with the phosphite are set forth in Table III below. J-VI contained 10× the amount of phosphite used in J-V but it was added to the formulation during the polymerization stage in the 800 ml. polyethylene beaker and not to the diol mixture in the degassing step. Therefore the contact time between the phosphite and impure butanediol prior to the polyurethane forming reaction was essentially zero. The gel time for J-VI was identical to that of J-I which contained no triphenyl phosphite at all. However, the addition of the phosphite at the polymerization stage did prevent the formation of the transient colors which were observed in J-I.

The amounts of triphenyl phosphite added to Samples J-II and J-III were without effect on the gel time although an increase in the suppression of color formation was observed. J-IV showed no color change and a slight decrease in gel time. However, at the 0.04% level of phosphite a very dramatic decrease in gel time was observed.

TABLE III

| Elastomer | J-I | J-II | J-III | J-IV | J-V | J-VI |
|---|---|---|---|---|---|---|
| % w/w triphenyl phosphite | 0 | 0.01 | 0.02 | 0.03 | 0.04 | 0.4 |
| degassing period of butanediol in contact with triphenyl phosphite (in hrs.) | — | regular 1.0 | 1.75 | 1.5 | 1.5 | 0 |
| color change | blue to green to intense yellow | blue to green to yellow | yellow | No color | No color | No color |
| gel time (sec.) | 35 | 35 | 35 | 30 | 6 | 35 |

EXAMPLE 4

A series of four elastomers (K through N) was prepared using the procedure set forth in Example 1 and the ingredients set forth in Table IV below. Samples L and N are in accordance with the present invention while Samples K and M are not. In this series both the caprolactone diol and the 1,4-butanediol were pure urethane grade materials.

Samples L and N employed 0.1 percent w/w based on total formulation weight of triphenyl phosphite in the diol degassing stage. Sample L contained 0.01 percent catalyst and N contained 0.025 percent catalyst. The control Samples K and M contained 0.01 and 0.025 percent catalyst respectively but did not contain the triphenyl phosphite.

The data in Table IV shows L to have a gel time half that of K. Color formation in the reaction mixture of Sample K was very slight yellow but Sample L showed the better color stability for both the reacting mixture and in the final pie. Sample N at the higher catalyst level was very fast with a gel time of 3 seconds versus the control time of 5 seconds at the same catalyst level but in the absence of triphenyl phosphite. Although color formation in Samples M and N was low it was not as good as in Sample L. Also, the color formation in K was less than in M and N.

The data shows clearly the preference for the lower catalyst level in conjunction with the triphenyl phosphite as in Sample L and demonstrates how the presence of triphenyl phosphite provides for maximum utilization of the stannous octoate catalyst even when the diols do not contain peroxide impurities. It also demonstrates that color bodies in the polyurethane forming reaction mixture and in the final polyurethane pie are minimized by the combination of low levels of stannous octoate in the presence of the triphenyl phosphite.

TABLE IV

| Elastomer | K | L | M | N |
|---|---|---|---|---|
| 4,4'-methylenebis(phenyl isocyanate); equiv. | 6.57 | 6.57 | 6.57 | 6.57 |
| polycaprolactone diol | | | | |

TABLE IV-continued

| Elastomer | K | L | M | N |
|---|---|---|---|---|
| (m.w. = 2000); equiv. | 1.0 | 1.0 | 1.0 | 1.0 |
| pure 1,4-butanediol; equiv. | 5.5 | 5.5 | 5.5 | 5.5 |
| stannous octoate solution % w/w | 0.01 | 0.01 | 0.025 | 0.025 |
| NCO/OH | 1.01 | 1.01 | 1.01 | 1.01 |
| gel time (seconds) | 20 | 10 | 5 | 3 |
| color change | very slight yellow | best color stability | slight yellow | slight yellow |

EXAMPLE 5

A series of four elastomers (O through R) was prepared using the procedure set forth in Example 1 and the ingredients set forth in Table V below. Samples P and R are in accordance with the present invention while Samples O and Q are not.

Similar to Example 4 all the hydroxyl containing constituents were pure urethane grade materials. The polymeric diol constituent used in the present samples was a polyalkyleneoxy diol. The data observed in this case is similar to that of Example 4.

Samples P and R employed 0.1 percent w/w based on total formulation weight of triphenyl phosphite in the diol degassing stage. Sample P contained 0.01 percent catalyst and R contained 0.025 percent catalyst. The controls O and Q contained 0.01 and 0.025 percent catalyst respectively but received no triphenyl phosphite treatment.

The data in Table V shows P to have a gel time about a third of that for O. The phenolic antioxidant already present in the diol could not protect the diol from the trace peroxidic impurity which impedes the catalytic effect of the stannous octoate. Sample R was very fast with a gel time faster than its control Sample Q. Similar to the elastomer series of Example 4, higher catalyst levels (samples Q and R) resulted in more color formation with the least coloration in Sample P. The data again supports the preference for the lower catalyst level in conjunction with the triphenyl phosphite as in Example P.

TABLE V

| Elastomer | O | P | Q | R |
|---|---|---|---|---|
| 4,4'-methylenebis(phenyl isocyanate); equiv. | 7.88 | 7.88 | 7.88 | 7.88 |
| polypropyleneoxypolyethyleneoxy diol[1]; equiv. | 1.0 | 1.0 | 1.0 | 1.0 |
| polyethyleneoxy diol (m.w. = 400); equiv. | 0.5 | 0.5 | 0.5 | 0.5 |
| pure 1,4-butanediol | 6.25 | 6.25 | 6.25 | 6.25 |
| monobutylether of diethylene glycol; equiv. | 0.05 | 0.05 | 0.05 | 0.05 |
| stannous octoate solution % w/w | 0.01 | 0.01 | 0.025 | 0.025 |
| NCO/OH | 1.01 | 1.01 | 1.01 | 1.01 |
| gel time (seconds) | 26 | 9 | 5 | 3 |
| color change | very slight yellow | best color stability | slight yellow | slight yellow |

Footnote to Table V
[1]Same diol described in footnote 1 of Table II including addition of the same phenolic antioxidant prior to the degassing step.

EXAMPLE 6

A series of three elastomers (S-I through S-III was prepared using the same procedure and formulation as used in Example 5 except for the difference in stannous octoate catalyst concentrations set forth in Table IV and for the fact that the polypropyleneoxypolyethyleneoxy diol had been stored in a partially filled drum over a period of about 64 hours in an oven at 70° C.

Sample S-III was prepared using the heat aged polyalkyleneoxy diol but treated with 0.1 percent triphenyl phosphite in accordance with the present invention. Samples S-I and S-II were not in accordance with the invention receiving no phosphite treatment.

The gel times observed are set forth in Table VI below along with the catalyst concentrations employed and the relevant data from Table V Example 5 for Samples O, P, Q, and R prepared with the pure unheated polyalkyleneoxy diol for comparison purposes.

Oven aging of the diol slowed the polyurethane reaction down notwithstanding the fact that the polyalkyleneoxy diol contained its own antioxidant in the form of the thiodiethylene bis-β(3,5-di-t-butyl-4-hydroxyphenyl)propionate. Sample S-I, although containing a higher catalyst concentration than Sample O, had a slower gel time. When the catalyst level was doubled in S-II the gel time was almost the same as that of Sample O whereas in the Sample Q a catalyst increase reflected about a 5× increase in the rate of reaction over that of Sample O. However, the treatment of the diol with 0.1% triphenyl phosphite returned the reaction rate to a level which conformed with Samples P and R.

TABLE VI

| Elastomer | O | Q | S-I | S-II | P | R | S-III |
|---|---|---|---|---|---|---|---|
| triphenyl phosphite % w/w | — | — | — | — | 0.1 | 0.1 | 0.1 |
| catalyst % w/w | 0.01 | 0.025 | 0.015 | 0.02 | 0.01 | 0.025 | 0.015 |
| gel time (seconds) | 26 | 5 | 30 | 20–25 | 9 | 3 | 4.5 |

EXAMPLE 7

A series of ten elastomers (T-I through X-I and T-II through X-II) was prepared using the same procedure and formulation used in Example 6 except as noted below. The different polyurethane catalysts used in each individually lettered pair of samples is set forth in Table VII below. The polyalkyleneoxy diol which had already received the heat treatment set forth in Example 6 was subjected to an additional exposure to oven storage at 90° C. prior to its use in this example. The T-I to X-I series of samples did not include a triphenyl phosphite treatment of the heated diol component whereas the T-II to X-II samples were prepared using diol which had been degassed in the presence of triphenyl phosphite. Sample T-II is the only sample prepared in accordance with the invention.

Comparison of the gel times recorded in Table VII shows clearly that only the combination of stannous octoate catalyst with the triphenyl phosphite gives rise to the dramatic decrease in gel time compared to its control run. With the four other commonly used polyurethane catalysts essentially no decrease in gel times could be observed for the treated over the untreated diol. In fact, in Sample W-II a sizeable increase in gel time over its control sample was noted.

TABLE VII

| Elastomer | T-I | T-II | U-I | U-II | V-I | V-II | W-I | W-II | X-I | X-II |
|---|---|---|---|---|---|---|---|---|---|---|
| triphenyl phosphite % w/w | — | 0.1 | — | 0.1 | — | 0.1 | — | 0.1 | — | 0.1 |
| catalyst: | | | | | | | | | | |
| stannous octoate sol'n.[1] | 0.1 cc. | 0.1 cc. | — | — | — | — | — | — | — | — |
| dibutyl tin dilaurate | — | — | 0.06 cc. | 0.06 cc. | — | — | — | — | — | — |
| 8% zinc octoate sol'n.[2] | — | — | — | — | 1 cc. | 1 cc. | — | — | — | — |
| 24% lead naphthenate sol'n.[3] | — | — | — | — | — | — | 0.01 cc. | 0.01 cc. | — | — |
| triethylenediamine % w/w | — | — | — | — | — | — | — | — | 1.0 | 1.0 |
| gel time (seconds) | 25 | 5 | 6 | 6 | 14 | 15 | 6 | 10 | 18 | 17 |

Footnotes to Table VII
[1] See Footnote 3 Table I.
[2] 8% zinc octoate in mineral spirits.
[3] 24% lead napthenate in mineral spirits.

We claim:

1. A process for the preparation of a non-cellular thermoplastic polyurethane elastomer characterized by good heat and color stability comprising the steps of:
   A. heating and degassing a mixture comprising:
      (i) a polymeric diol having a molecular weight in the range of 500 to 3000;
      (ii) an aliphatic diol having from 2 to 6 carbon atoms inclusive; and
      (iii) a minor amount of phosphorus compound having the formula $PX_3$ wherein each X is a radical independently selected from the group consisting of aryl, aryloxy, and lower alkoxy, and thereafter
   B. reacting a sufficient amount of the mixture derived from (A) with 4,4'-methylenebis(phenyl isocyanate) in the presence of reduced amounts of a stannous tin catalyst so that the overall ratio of equivalents of isocyanate to equivalents of active hydrogen containing materials is within the range of 0.95:1 to 1.10:1.

2. A process according to claim 1 wherein said polymeric diol is a polyester diol and said diol extender is 1,4-butanediol.

3. A process according to claim 1 wherein said polymeric diol is a polyalkyleneoxy diol and said diol extender is 1,4-butanediol.

4. A process according to claim 1 wherein X in said phosphorus compound is an aryloxy radical.

5. A process according to claim 1 wherein said stannous tin catalyst is stannous octoate.

6. A process for the preparation of a non-cellular thermoplastic polyurethane elastomer characterized by good heat and color stability comprising the steps of:
   A. heating and degassing a mixture comprising:
      (i) a polypropyleneoxypolyethyleneoxy diol having a molecular weight of about 2000;
      (ii) 1,4-Butanediol; and
      (iii) a minor amount of triphenyl phosphite, and thereafter
   B. reacting a sufficient amount of the mixture derived from (A) with 4,4'-methylenebis(phenyl isocyanate) in the presence of a reduced catalytic amount of stannous octoate so that the overall ratio of equivalents of isocyanate to equivalents of active hydrogen containing materials is about 1.01.

7. A process for the preparation of a thermoplastic polyurethane elastomer comprising the steps of:
   A. heating and degassing a mixture comprising:
      (i) a polycaprolactone diol having a molecular weight of about 2000;
      (ii) 1,4-butanediol; and
      (iii) a minor amount of triphenyl phosphite, and thereafter
   B. reacting a sufficient amount of the mixture derived from (A) with 4,4'-methylenebis(phenyl isocyanate) in the presence of a reduced catalytic amount of stannous octoate so that the overall ratio of equivalents of isocyanate to equivalents of active hydrogen containing materials is about 1.01.

* * * * *